United States Patent
Lewis

(10) Patent No.: US 10,892,980 B2
(45) Date of Patent: Jan. 12, 2021

(54) ROUTING AGGREGATED CARRIERS IN A DISTRIBUTED ANTENNA SYSTEM

(71) Applicant: Maven Wireless Sweden AB, Kista (SE)

(72) Inventor: Michael Lewis, Märsta (SE)

(73) Assignee: Maven Wireless Sweden AB

( * ) Notice: Subject to any disclaimer, the term of this patent is extended or adjusted under 35 U.S.C. 154(b) by 0 days.

(21) Appl. No.: 16/488,075

(22) PCT Filed: Feb. 22, 2018

(86) PCT No.: PCT/EP2018/054414
§ 371 (c)(1),
(2) Date: Aug. 22, 2019

(87) PCT Pub. No.: WO2018/154001
PCT Pub. Date: Aug. 30, 2018

(65) Prior Publication Data
US 2020/0067815 A1   Feb. 27, 2020

(30) Foreign Application Priority Data

Feb. 23, 2017 (SE) ...................... 1750193

(51) Int. Cl.
*H04L 12/727* (2013.01)
*H04B 7/024* (2017.01)
(Continued)

(52) U.S. Cl.
CPC .......... *H04L 45/121* (2013.01); *H04B 7/024* (2013.01); *H04B 10/25752* (2013.01);
(Continued)

(58) Field of Classification Search
None
See application file for complete search history.

(56) References Cited

U.S. PATENT DOCUMENTS

| 5,455,569 A | 10/1995 | Sherman et al. |
| 8,879,604 B2 | 11/2014 | Woo et al. |

(Continued)

FOREIGN PATENT DOCUMENTS

| WO | 2014127317 A1 | 8/2014 |
| WO | 2016086958 A1 | 6/2016 |

OTHER PUBLICATIONS

International Search Report and Written Opinion for International Application No. PCT/EP2018/054414, dated Jun. 5, 2018, 11 pages.

(Continued)

*Primary Examiner* — Jay L Vogel
(74) *Attorney, Agent, or Firm* — RatnerPrestia

(57) ABSTRACT

A method performed by a digital Distributed Antenna System ("DAS") for routing aggregated carriers received by at least one digital master unit of the DAS to at least one digital remote unit of the DAS. The method includes identifying the received aggregated carriers to be transmitted to a wireless communication device located in a coverage area served by the at least one digital remote unit, and routing the identified aggregated carriers through the DAS such that the carriers are transported to said at least one digital remote unit for transmission to the wireless communication device.

17 Claims, 10 Drawing Sheets

(51) Int. Cl.
  *H04B 10/2575* (2013.01)
  *H04L 12/891* (2013.01)
  *H04W 40/12* (2009.01)
  *H04W 88/08* (2009.01)

(52) U.S. Cl.
  CPC ............ *H04L 47/41* (2013.01); *H04W 40/12* (2013.01); *H04W 88/085* (2013.01)

(56) References Cited

U.S. PATENT DOCUMENTS

| | | | |
|---|---|---|---|
| 8,989,046 B1 | 3/2015 | Train | |
| 10,129,889 B1* | 11/2018 | Marupaduga | H04W 72/0453 |
| 2004/0156345 A1 | 8/2004 | Steer et al. | |
| 2004/0205105 A1 | 10/2004 | Larsson et al. | |
| 2005/0031045 A1 | 2/2005 | Mayor et al. | |
| 2007/0177512 A1 | 8/2007 | Alexander | |
| 2009/0257533 A1 | 10/2009 | Lindoff et al. | |
| 2010/0020685 A1* | 1/2010 | Short | H04L 12/14 370/230 |
| 2011/0111700 A1 | 5/2011 | Hackett | |
| 2012/0178483 A1 | 7/2012 | Rosenau | |
| 2013/0064076 A1 | 3/2013 | Periyalwar et al. | |
| 2013/0064233 A1 | 3/2013 | Hethuin et al. | |
| 2013/0094425 A1 | 4/2013 | Soriaga et al. | |
| 2013/0122830 A1 | 5/2013 | Wang et al. | |
| 2013/0286817 A1 | 10/2013 | Allan | |
| 2014/0036770 A1 | 2/2014 | Stapleton et al. | |
| 2014/0219255 A1 | 8/2014 | Eyuboglu et al. | |
| 2015/0098372 A1* | 4/2015 | Zavadsky | H04W 88/085 370/281 |
| 2015/0264626 A1 | 9/2015 | Perdomo | |
| 2016/0127101 A1* | 5/2016 | Hanson | H04W 16/02 375/267 |
| 2016/0323882 A1* | 11/2016 | Yang | H04W 4/70 |
| 2016/0329933 A1 | 11/2016 | Kummetz et al. | |
| 2017/0085405 A1* | 3/2017 | Xu | H04L 27/2272 |
| 2017/0310595 A1 | 10/2017 | Avidar et al. | |
| 2017/0317722 A1* | 11/2017 | Lange | H04W 52/42 |
| 2017/0367061 A1 | 12/2017 | Kim et al. | |
| 2018/0013787 A1 | 1/2018 | Jiang | |
| 2018/0124729 A1* | 5/2018 | Hanson | H04W 56/004 |
| 2018/0139680 A1 | 5/2018 | Hui et al. | |

OTHER PUBLICATIONS

International Preliminary Report on Patentability for International Application No. PCT/EP2018/054414, dated Apr. 24, 2019, 7 pages.
Swedish Office Action for Swedish Application No. 1750193-3, dated Aug. 18, 2017, 10 pages.
Seifi et al., "Joint Transmission Mode and Tilt Adaptation in Coordinated Small-Cell Networks", ICC'14—W3: Workshop on Small Cell and 5G Networks, 2014, pp. 598-603.
Heath et al., "A Current Perspective on Distributed Antenna Systems for the Downlink of Cellular Systems", IEEE Communications Magazine, 2013, pp. 161-167.
Notice of Allowance for U.S. Appl. No. 16/486,198, dated Sep. 18, 2020, 7 pages.

* cited by examiner

ROUTING AGGREGATED CARRIERS IN A DISTRIBUTED ANTENNA SYSTEM

TECHNICAL FIELD

The invention relates to a digital distributed antenna system (DAS) and a method performed by the digital DAS of routing aggregated carriers.

BACKGROUND

A distributed antenna system (DAS) is a technology for providing radio coverage in an area which cannot be directly served from the general mobile radio network (for example, tunnels in a metro system, or a building complex), and is particularly advantageous in applications where multiple wireless service providers need to provide coverage since a single DAS can be used with many radio base stations.

A typical digital DAS is shown in FIG. 1 and consists of head-end equipment, herein referred to as digital master units (DMUs) 14, 15, which receive downlink signals from a number of radio base stations (RBSs) 10-13, and convert them for transport on optical fibers 16, 17 via one or more routing units (RUTs) 18 to a number of remote nodes 19, 20, herein referred to as digital remote units (DRUs), located in the coverage area which convert the optical signals into radio signals which can be broadcast on antennas driven by the DRUs 19, 20 for transport to/from wireless communication devices 21, 22 such as smart phones and tablets. Each DRU 19, 20 receives uplink signals from its connected antenna(s) and converts them for transmission over the optical fibers 16, 17 back to the DMUs 14, 15 and onward to the RBSs 10-13.

A modern active DAS, as that illustrated in FIG. 1, transports the radio signals in the form of digital samples, usually over fiber optic connections though not always. Digital data transport allows for flexible routing and distribution of radio signals with a much finer degree of control over which signals go to which DRU.

Base station signals are converted into filtered streams of digital data corresponding to the different carrier frequency allocations, and uplink signals are likewise filtered according to the frequency allocations and sent back to the base stations. The base station interface can be analogue (for instance, with RF downlink and uplink signals) or digital (where the downlink and uplink signals are encoded in digital form). A remote node supports a finite number of frequency bands (for example, 4 bands). Where more bands are needed in a coverage area, several remote nodes can be connected so that they transmit in parallel within the coverage area. With a digital DAS it is straightforward to connect a pair of remote nodes in a daisy-chain configuration in order to route signals to and from both.

A main goal of a DAS system is to not only provide coverage for mobile devices but also to enable high data capacity by providing a high quality link between the base stations and the mobile terminals within the coverage area. Release to of the Long-Term Evolution (LTE) standard introduced the concept of "carrier aggregation" to increase the maximum available data rates. Carrier aggregation allows a mobile terminal to receive data from more than one base station carrier signal in the downlink, and optionally to transmit data in more than one base station uplink frequency allocation.

Each carrier has at most 20 MHz bandwidth allocated to it; with carrier aggregation several carriers can be used in parallel to give a maximum bandwidth up to 100 MHz and correspondingly higher data rate.

However, carrier aggregation is problematic for state of the art DAS structures as the DAS structures do not take into account that the aggregated carriers of for example an aggregated carrier pair indeed are strongly related to each other and as such cannot be treated as independent carriers, but must be carefully transported through the DAS in order to finally be transmitted in an intended coverage area provided by the DAS.

SUMMARY

An object of the present invention is to solve, or at least mitigate, this problem in the art and to provide a DAS using an improved method of routing aggregated carriers trough the DAS.

This object is attained in a first aspect of the invention by a method performed by a digital distributed antenna system (DAS) of routing aggregated carriers received by at least one digital master unit of the DAS to at least one digital remote unit of the DAS. The method comprises identifying the received aggregated carriers to be transmitted to a wireless communication device located in a coverage area served by the at least one digital remote unit, and routing the identified aggregated carriers through the DAS such that the carriers are transported to said at least one digital remote unit for transmission to the wireless communication device.

This object is attained in a second aspect of the invention by a digital DAS configured to route aggregated carriers received by at least one digital master unit of the DAS to at least one digital remote unit of the DAS, the DAS comprising at least one processing unit configured to cause the DAS to identify the received aggregated carriers to be transmitted to a wireless communication device located in a coverage area served by the at least one digital remote unit, and route the identified aggregated carriers through the DAS such that the carriers are transported to said at least one digital remote unit for transmission to the wireless communication device.

Hence, a DMU identifies the received aggregated carriers to be submitted to a wireless communication device (WCD) located in a coverage area served by one of the DRUs of the DAS.

In order to identify aggregated carriers, the DMU may for instance communicate with a radio resource management database in the operator network, which will inform the DMU that the first carrier and the second carrier received at the DMU indeed form an aggregated carrier pair.

Pre-stored configuration information in a DAS database allows the relevant base station carriers to be mutually identified. Hence, the DAS acquires information from the DAS database about which carriers are aggregated.

Now, upon having identified the received first and second carriers as being aggregated carriers, the DMU will determine to which DRU the aggregated carriers should be transported, group the two carriers and transport the aggregated carriers via a DAS transport network to the intended DRU.

Thus, the DMU will advantageously route the component carriers, which even may be received via separate base stations, as an aggregated carrier pair to the DRU for which the aggregated carriers are intended.

In an embodiment, in case the routing of the identified aggregated carriers through the DAS comprises routing the identified aggregated carriers via different routing paths, the method comprises determining a processing delay of each of the different routing paths. Thereafter, a delay element arranged in at least a first of the routing paths—having a smaller processing delay than at least a second of the routing paths—is controlled to cause further delay to a first aggregated carrier routed via the first routing path, in order to reduce a time difference between the first aggregated carrier routed via the first routing path and a second aggregated carrier routed via the second routing path.

Requirements on timing alignment between base station transmissions of the aggregated carriers are strict, and the WCDs are required to cope with propagation delay differences of up to 30 s between aggregated carriers. There is a requirement that the base station time alignment error between component carriers is kept to less than 260 ns for inter-band and non-contiguous intra-band aggregation, and less than 130 ns for intra-band contiguous aggregation.

With this embodiment, any processing delay caused by the DAS when routing the aggregated carriers is compensated for such that ultimately no time difference between the component carriers is present when the aggregated carriers are submitted via DRU antennas to an intended WCD.

In an embodiment, the delay of each routing path through the DAS is measured before or during installation of the DAS, and is entered in a database which is accessible by the DAS for subsequently selecting adequate routing paths through the DAS. With this approach, the DAS may conveniently consult the database for any routing path delay in order to control the delay elements such that any time differences between aggregated carriers are eliminated before the carriers are submitted over DRU antennas to an intended WCD.

In yet further embodiments, the delay element is implemented by means of a ring buffer configured to buffer samples of an aggregated carrier to be further delayed for reducing any time differences, or by passing samples of one or more aggregated carriers through a fractional delay filter.

Further embodiments of the invention will be set forth in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown.

This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
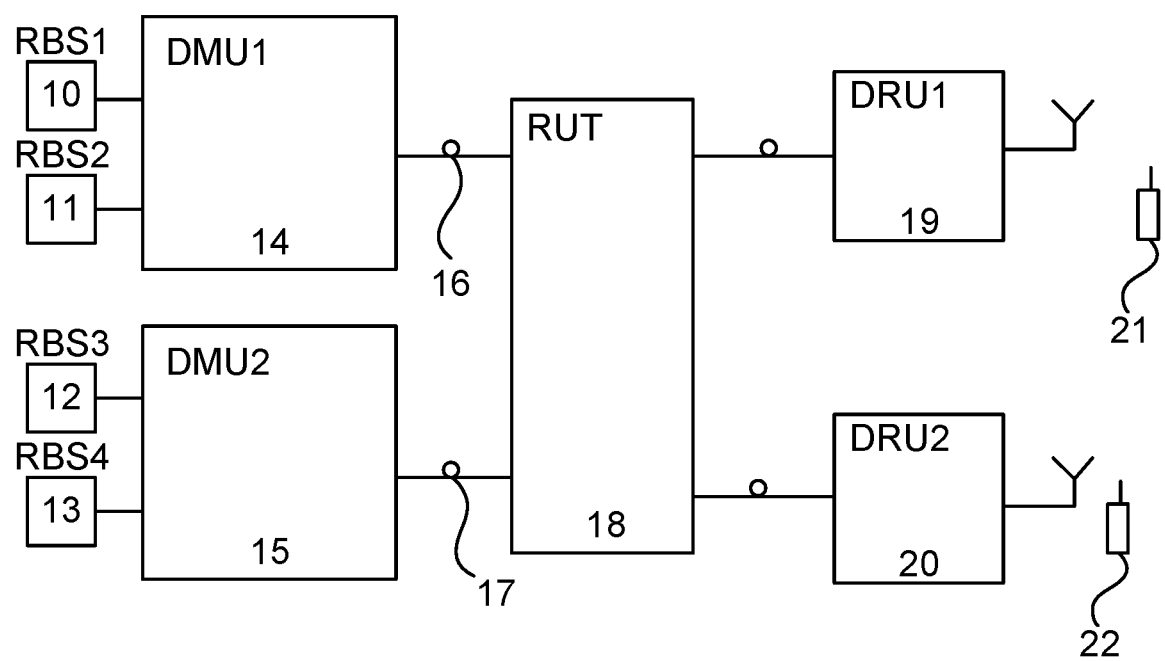
FIG. 1 illustrates a typical digital DAS.

FIG. 1 illustrates a typical digital DAS and has previously been described in the background art section.

Figure 2:
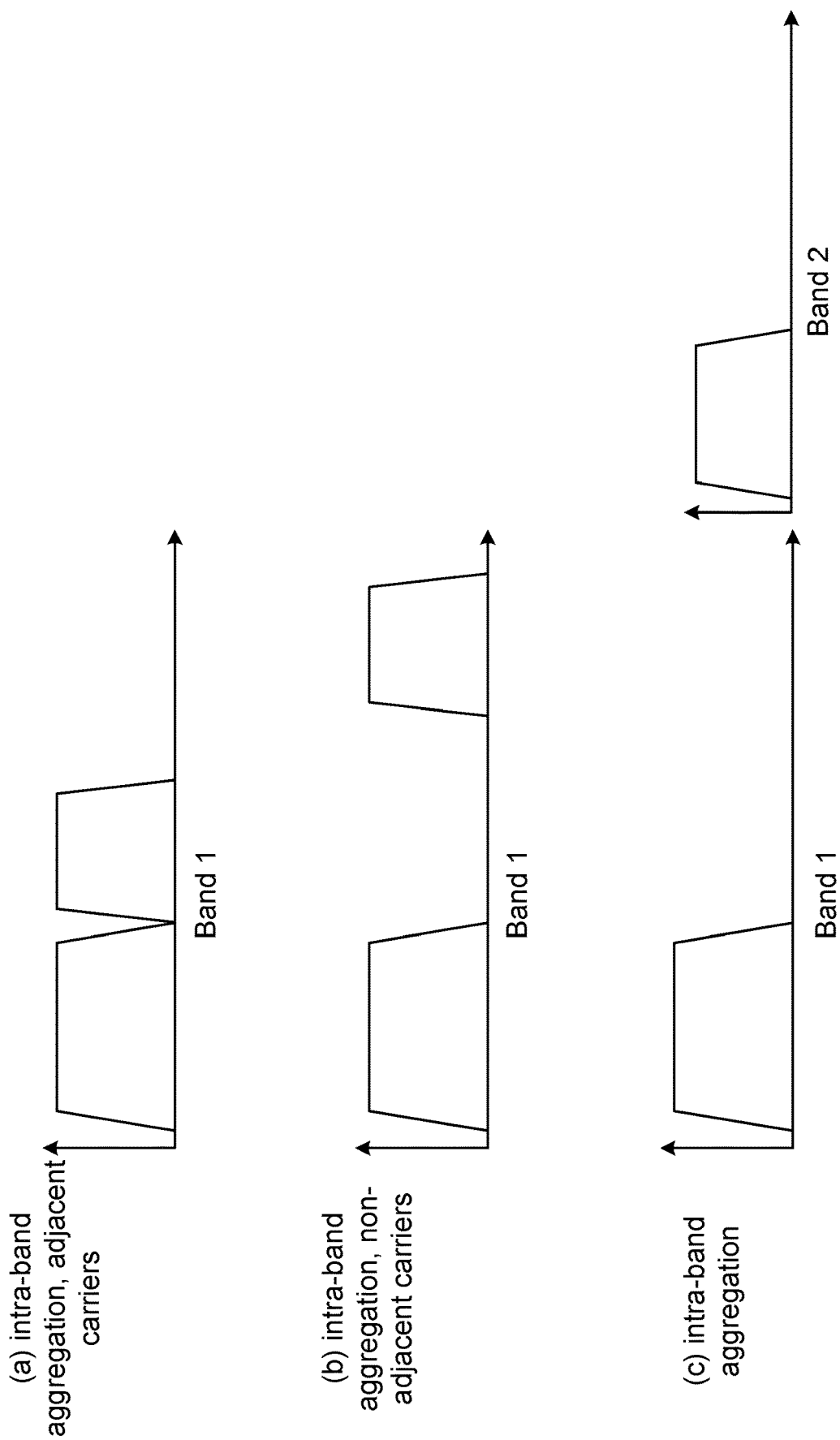
FIGS. 2a-c illustrate different types of carrier aggregation.

Carrier aggregation is denoted as intra-band or inter-band depending on whether the carriers are in the same or different frequency bands. FIG. 2 shows some simple examples of different scenarios with two aggregated carriers, commonly referred to as component carriers.

FIG. 2a shows contiguous intra-band carrier aggregation, where the two carriers are located in adjacent frequency ranges within the same frequency band. This is the simplest case, since from the point of view of transport the two carriers can effectively be treated as a single large carrier. In a DAS system, a single wide filter could be used to capture the signals which could then be transmitted as a single data stream.

FIG. 2b shows non-contiguous intra-band carrier aggregation. The carriers are located within the same frequency band but there is a gap between the carriers. This scenario arises frequently when a mobile operator has frequency allocations which are spread across the band, with allocations of other mobile operators in between.

FIG. 2c shows inter-band carrier aggregation. In this case the two carriers are in completely different frequency bands.

In practice more than two carriers can be aggregated, with any combination of intra- and inter-band aggregation. Also, each carrier might use MIMO (multiple input, multiple output) in which case the base station transmits and receives over several antennas, using the same frequency ranges for each antenna.

Figure 3:
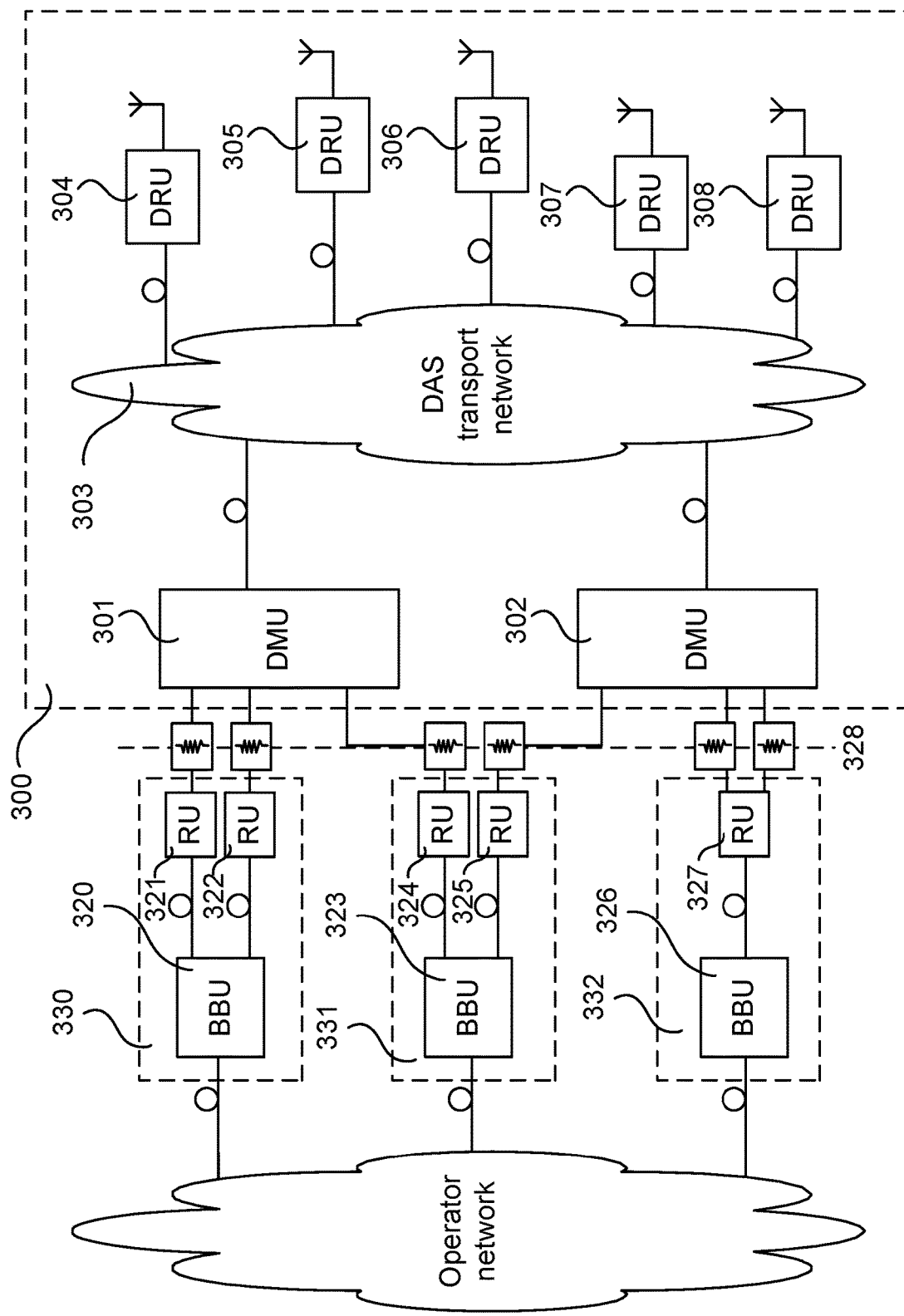
FIG. 3 exemplifies how aggregated carriers may be connected to a DAS in an embodiment of the invention.

FIG. 3 shows some examples of how aggregated carriers may be connected to a DAS 300 in an embodiment of the invention. If the RBS-DAS interface uses analogue RF signals, the carrier signals are received from the RBS radio units (RU). The base station vendors have a great deal of freedom in how the aggregated carriers are implemented.

For instance, they may be generated from a single baseband unit (BBU) 320 of first RBS 330 which transmits the different carriers on several different RUs 321, 322 connected to that BBU, and on to a first DMU 301 of the DAS 300 which routes the carriers over a DAS transport network 303 and on to one or more DRUs, in this particular exemplifying embodiment illustrated by means of five DRUs 304-308 each serving one or more wireless communication devices located in a coverage area as provided by the respective DRU.

Further, a single BBU 323 of a second RBS 331 may generate aggregated carriers which are transmitted via different RUs 324, 325 to a plurality of DMUs 301, 302 of the DAS 300 for further routing to one or more of the DRUs 304-308 Alternatively, a single RU 327 of a third RBS 332 might transmit several carriers from one BBU 326 to the DAS 300. It is also possible that several BBUs are connected through the operator's network and coordinate with one another such that one BBU transmits one set of carriers and the other BBU transmits another set of carriers.

The DAS 300 converts the radio signals received over the analogue RF interface 328 into digital signals, and then filters out the different carriers in the downlink direction to generate separate digital data streams for each carrier which are then converted back into RF signals at the DRUs 304-308 for transmission via DAS antennas connected to the DRUs.

From an installation perspective, it is desirable that the DAS connection point is flexible (i.e. any base station connection can be made to any DMU 301, 302 in the DAS 300). It should be noted that cooperating base stations may not even be physically located in the same place.

Figure 4:
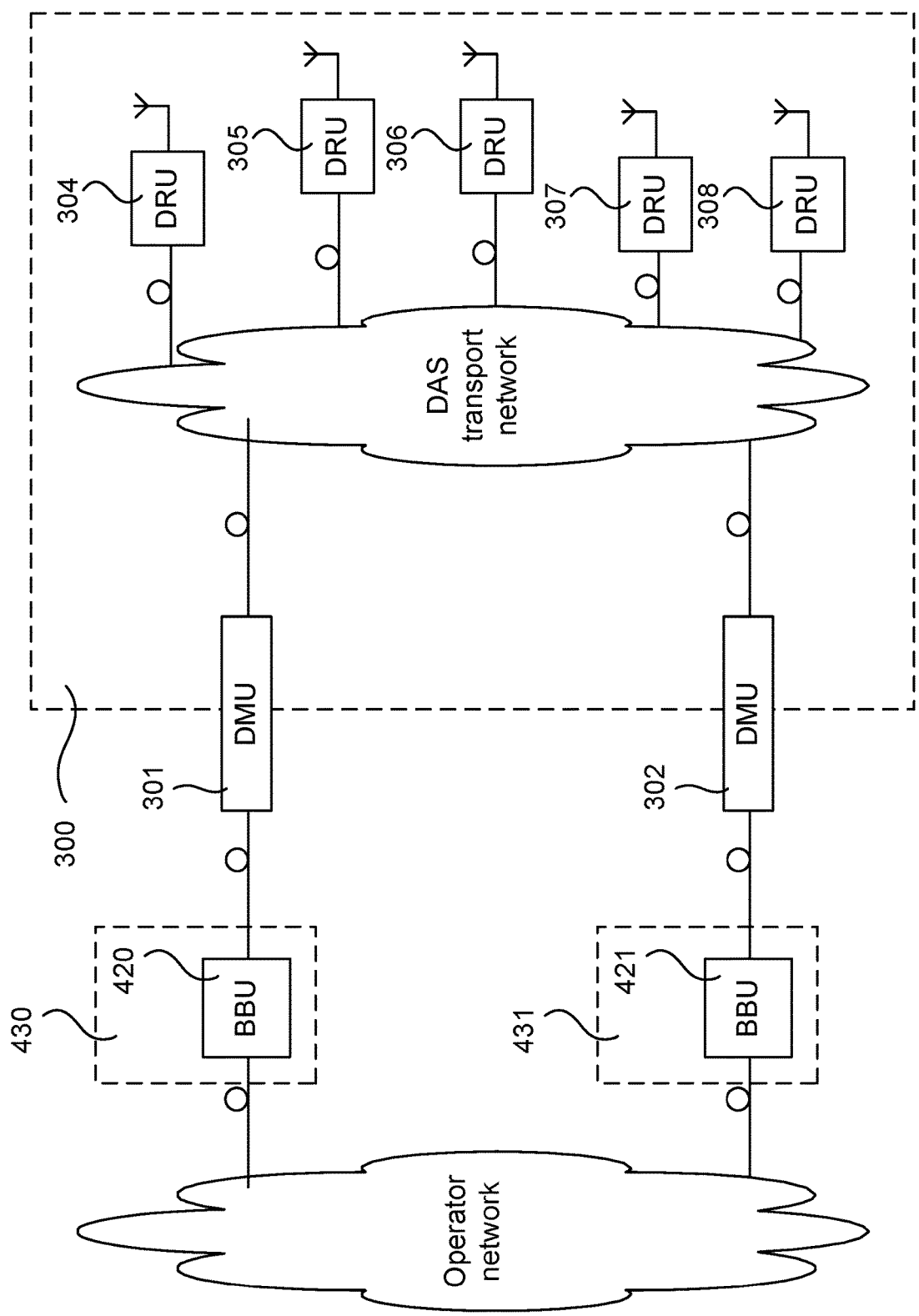
FIG. 4 shows an example where digital interfaces are connected to the DAS directly from a respective BBU.

FIG. 4 shows an example where digital interfaces are connected directly from the respective BBU 420, 421 of a first RBS 430 and a second RBS 431 to the DAS 300 via the DMUs 301, 302. Each BBU 420, 421 has one or more digital connections to one or more DMU. The digital signals carry sampled baseband data for each carrier, which the DAS 300 convert to a suitable format for internal routing to and from the DRUs 304-308 where the RF signals are transmitted in the downlink and received in the uplink.

In this case the different RU connection options of FIG. 3 do not apply, but it may still be the case that aggregated carriers are generated across several base stations and/or are sent on different digital connections into the DAS 300.

The addition of carrier aggregation to the LTE standard causes problems in a digital DAS. One of the main benefits of a digital DAS is that it is possible to route signals to different destinations according to changing needs, i.e. the signals received at the DMUs 301, 302 may practically be routed to any DRU 304-308 in the digital DAS 300.

This possibility brings about a risk that a service engineer performing a reconfiguration may fail to observe the fact that aggregated carriers are in use, and only re-route one of the aggregated carriers. The base stations expect that wireless communication devices served in the respective coverage area can receive all of the aggregated carriers, and if one of the carriers is missing then aggregation with that carrier will no longer be possible. The LTE standard already anticipates the case that different aggregated carriers may not be possible to receive by all terminals, so there will be no catastrophic failure, but network capacity will be wasted in generating measurement reports from wireless communication devices for carriers which do not exist at all in the coverage area and the mobile operator will be unable to deliver the expected performance to their customers.

Figure 5:
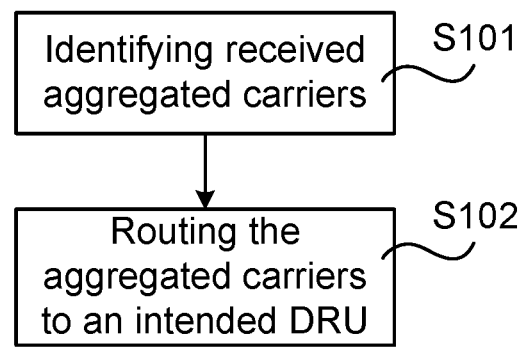
FIG. 5 illustrates a flowchart of a method of routing aggregated carriers through a DAS according to an embodiment of the invention.

This problem in the art is overcome by an embodiment of the invention described with reference to the flowchart of FIG. 5. Reference will further be made to the system of FIG. 3.

Assuming for instance that an operator's network is configured such that a first carrier is transmitted to the first DMU 301 of the DAS 300 via first BBU 320 over the RU 322 while a second carrier is transmitted to the first DMU 301 of the DAS 300 via second BBU 322 over the RU 324, which first and second carriers form an aggregated carrier pair, as illustrated for example in FIG. 2a. Each aggregated carrier is commonly referred to as a component carrier (CC).

In an embodiment of the method of routing the aggregated carriers through the DAS 300, the first DMU 301 identifies in step S101 the received aggregated carriers to be submitted to a wireless communication device (WCD) located in a coverage area served by one of the DRUs 304-308 of the DAS 300, for instance the DRU 304.

In order to identify aggregated carriers, the first DMU 301 may for instance communicate with a radio resource management database in the operator network, which will inform the first DMU 301 that the first carrier and the second carrier received at the first DMU 301 indeed form an aggregated carrier pair. The information regarding which BBU/RU is connected to which DMU of the DAS can be input by a system installer using a graphical user interface (GUI) for management of the DAS and is stored in an internal database. This stored information allows the relevant base station carriers to be mutually identified between the operator radio resource management database and the DAS RF routing parameters (frequency range, input port and destination DRU). Alternatively, the aggregated carriers may be identified by means of manually marking them in the DAS management GUI during installation and storing the information about which carriers are aggregated within the DAS internal database.

Now, upon having identified the received first and second carriers as being aggregated carriers, the first DMU 301 will determine to which DRU the aggregated carriers should be transported, group the two carriers and transport the aggregated carriers via the DAS transport network 303 to the intended DRU.

Thus, the first DMU 301 will in step S102 advantageously route the carrier components received via separate BBUs 320, 321 as an aggregated carrier pair to the DRU for which the aggregated carriers are intended, in this particular exemplifying embodiment the DRU 304.

A more serious structural problem is caused by the requirements on timing alignment between base station transmissions of the aggregated carriers. The WCDs are required to cope with propagation delay differences of up to 30 s between aggregated carriers, and there is a requirement that the base station time alignment error between component carriers is kept to less than 260 ns for inter-band and non-contiguous intra-band aggregation, and less than 130 ns for intra-band contiguous aggregation.

Test specifications explicitly for a DAS currently do not exist, and there is some scope to argue that a DAS with an analogue RF interface can be viewed as part of the signal path rather than as part of the base station. However a DAS with digital connection is likely to be viewed as part of the base station and be held to the same standards. Signals routed through the DAS will in general experience different delays if they are fed across different routes. For a DAS with an analogue interface such delay variations will eat into path delay difference budget for the WCDs. For a DAS with a digital interface such delay differences may mean that the system as a whole does not meet type approval requirements.

This problem in the art is overcome by embodiments of the invention described with reference to the different DAS 300 routings of FIGS. 6 and 8 and to the flowcharts of FIGS. 7 and 9.

Figure 6:
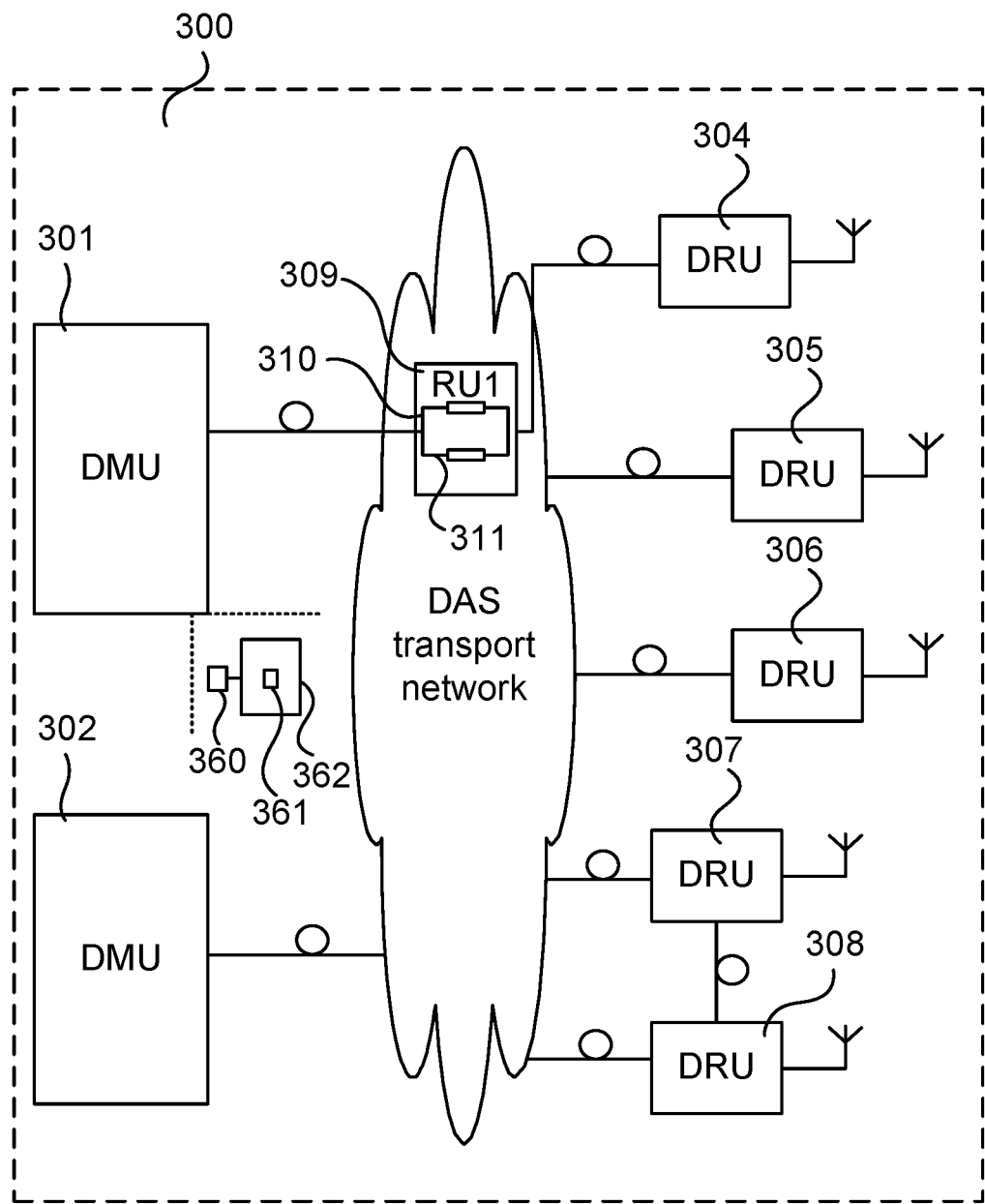
FIG. 6 illustrates a DAS according to a further embodiment of the invention.

FIG. 6 shows the DAS 300 as previously described, with the addition that a routing unit 309 is incorporated in the DAS transport network 303 (as previously has been discussed with reference to FIG. 1), via which routing unit 309 each component carrier is routed to the DRU 304.

In a digital DAS, there are many routing options for routing a signal from a DMU to a DRU (and vice versa). For simplicity, the routing unit 309 is illustrated to have a first routing path 310 and a second routing path 311 where each routing path provides functions such as e.g. serializing of data, filtering and scheduling of data. Typically, each routing path 310, 311 causes its own individual delay to a signal being processed via the respective path. It should further be noted that the DMUs 301, 302 and the DRUs internally typically provides numerous possible routes.

Again with reference to FIG. 6, illustrating the DAS 300 in an embodiment of the invention, the steps of the method performed by the DAS 300 are in practice performed by a processing unit 360 embodied in the form of one or more microprocessors arranged to execute a computer program 361 downloaded to a storage medium 362 associated with the microprocessor, such as a Random Access Memory (RAM), a Flash memory or a hard disk drive. The processing unit 360 is arranged to cause the DAS 300 to carry out the method according to embodiments when the appropriate computer program 361 comprising computer-executable instructions is downloaded to the storage medium 362 and executed by the processing unit 360. The storage medium 362 may also be a computer program product comprising the computer program 361. Alternatively, the computer program 361 may be transferred to the storage medium 362 by means of a suitable computer program product, such as a Digital Versatile Disc (DVD) or a memory stick. As a further alternative, the computer program 361 may be downloaded to the storage medium 362 over a network. The processing unit 360 may alternatively be embodied in the form of a digital signal processor (DSP), an application specific integrated circuit (ASIC), a field-programmable gate array (FPGA), a complex programmable logic device (CPLD), etc.

Typically, each of the DMUs 301, 302, and the DAS transport network 303 as well as the DRUs 304-308 comprise these or similar components in order to perform appropriate operations.

Figure 7:
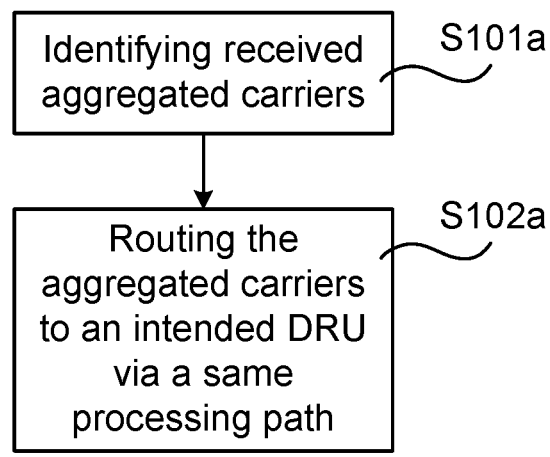
FIG. 7 illustrates a flowchart of a method of routing aggregated carriers through a DAS according to another embodiment of the invention.

In the embodiment illustrated with the flowchart of FIG. 7, after the aggregated carriers are identified by the first DMU 301 in step S101, the first DMU 101 will collectively route the two aggregated carries to the DRU 304 in step S102a via the same routing path of the routing unit 309. That is, the first and the second carrier will both be routed either via the first routing path 310 or via the second routing path 311.

Advantageously, this will cause the same processing delay to the two aggregated carriers from the arriving of the aggregated carriers at the first DMU 301 to the DRU 304, where the aggregated carriers are transmitted over one or more DAS antennas to a WCD for which the aggregated carriers are intended, and the DAS will hence not cause any time difference between the aggregated carriers.

Figure 8:
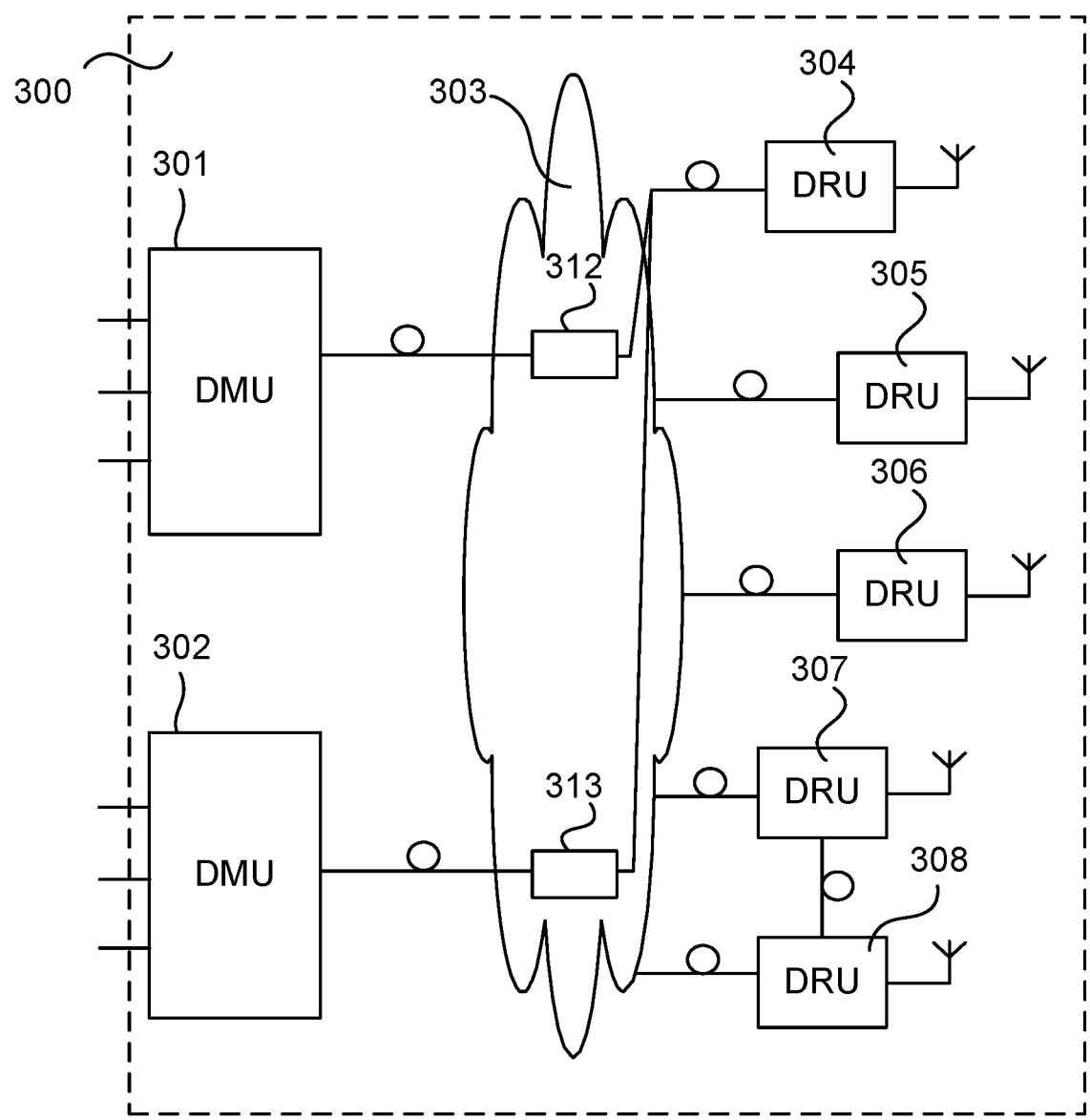
FIG. 8 illustrates a DAS according to yet another embodiment of the invention.

FIG. 8 shows the DAS 300 in a different embodiment. In this embodiment, it is assumed that an aggregated carrier pair is received at the DAS 300 where a first component carrier of the pair is received by the first DMU 301 while a second component carrier of the pair is received by the second DMU 302. It is further assumed that the aggregated carrier pair is intended for the first DRU 304 serving a WCD to which the aggregated carrier pair is transmitted.

Figure 9:
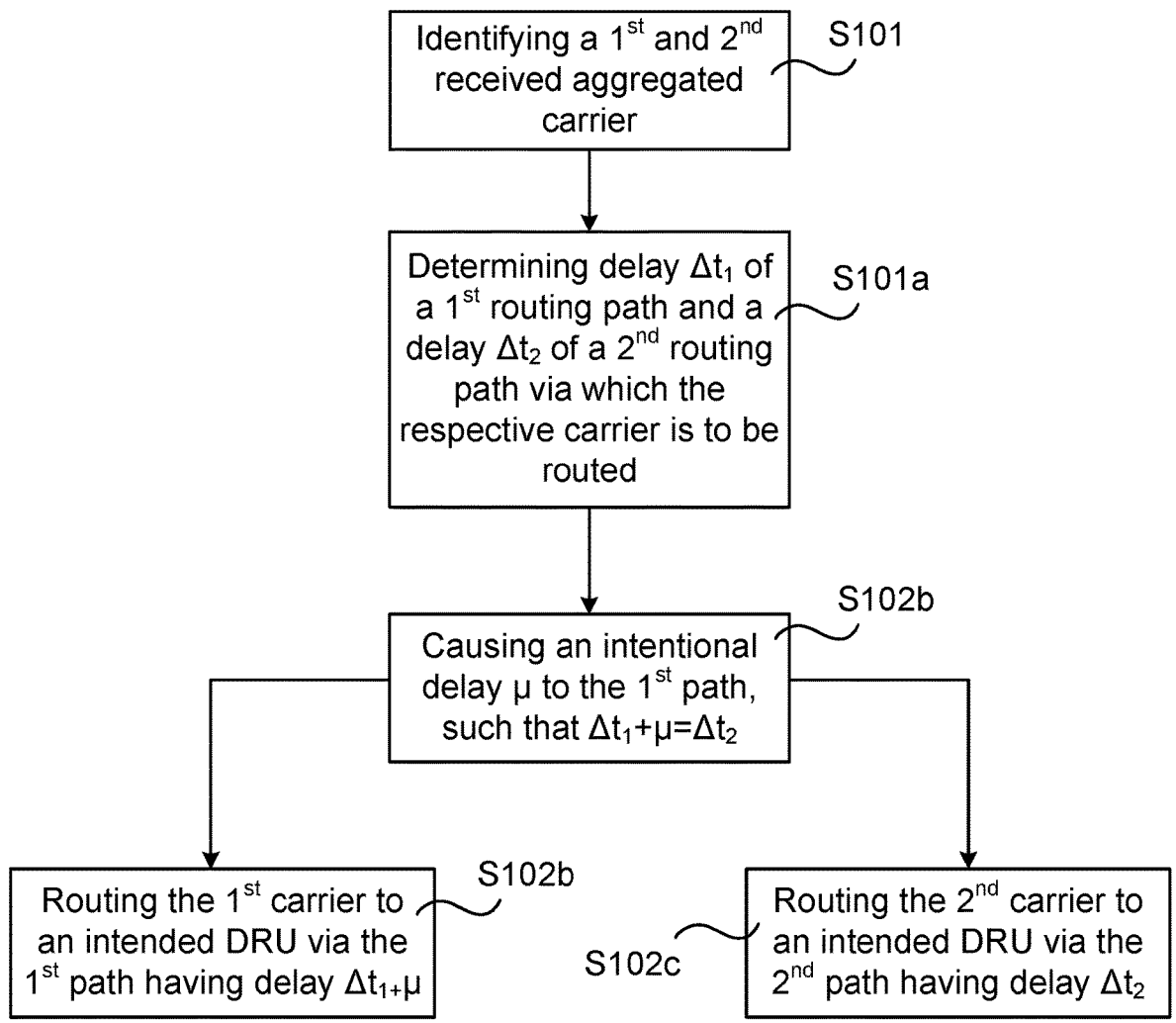
FIG. 9 illustrates a flowchart of a method of routing aggregated carriers through a DAS according to yet another embodiment of the invention.

Reference is further made to the flowchart of FIG. 9.

Now, as discussed hereinabove, the two component carriers should optimally arrive at the WCD simultaneously, or at least not with a time difference exceeding a stipulated maximal allowed time difference. However, it may very well be the case that a first routing path 312 through the DAS 300 is subjected to one processing delay $\Delta t_1$, while a second routing path 313 is subjected to another processing delay $\Delta t_2$, thereby causing a total time difference $\Delta t = \Delta t_1 - \Delta t_2$.

In an embodiment, the delay of each routing path through the DAS 300 is measured before or during installation of the DAS 300, and entered in a database, which is accessible by the DMUs 301, 302 for selecting adequate routing paths through the DAS 300.

By arranging the routing paths with delay elements, the delay of which can be controlled and adjusted by, e.g., the DMUs 301, 302, it is possible for the DAS 300 to adapt to the inherent routing path processing delays such that the DAS 300 does not cause a time difference between the component carriers which are transmitted from the first DRU 304.

Hence, after the aggregated carriers have been identified in step S101 as both being intended for the first DRU 304, the processing delay of the first routing path 312 and the second routing path 323 is determined in S101a. It is assumed that the processing delay $\Delta t_1$ of the first routing path 312 is smaller than the delay $\Delta t_2$ of the second routing path 313; $\Delta t_2 = \mu + \Delta t_1$.

The DAS 300 may thus cause an artificial delay pa to the first routing path 312 in step S101b by adjusting the delay of said delay element (being e.g. a ring buffer) such that the delay element delays the first component carrier by pa. As a result, the time difference $\Delta t$ caused by the DAS 300 to the aggregated carriers advantageously becomes zero.

In this embodiment, the first component carrier will hence intentionally be subjected to a delay $\mu$ (or close to $\mu$), for example by means of using a FIFO ring buffer as a delay element, upon the first carrier being routed via the first routing path 312 in step S102b, while the second carrier is routed via the second routing path 313 in step S102c.

It is noted that the same delay problem would have arisen if e.g. the first component carrier would have been transmitted by the first DMU 301 to the WCD via the first DRU 305 while the second component carrier would have been transmitted by the second DMU 302 to said WCD via the second DRU 305 (even though a different delay value is likely to apply to the routing path extending from the second DMU 302 to the second DRU 305).

Similarly, the same delay problem would have arisen if e.g. the first component carrier would have been transmitted by the first DMU 301 to the WCD via the first DRU 305 while the second component carrier also would have been transmitted by the first DMU 302 to said WCD but via the second DRU 305 (even though a different delay value is likely to apply to the routing path extending from the first DMU 301 to the second DRU 305).

Hence, as soon as one component carrier is routed via one routing path while another component carrier is routed via another routing path having a different delay, this delay problem potentially arises.

It is further noted that if the first routing path 312 and the second routing path 313 would have the same processing delay—i.e. $\Delta t_2 = \Delta t_1$—it is not necessary to activate the delay element of the second path to cause the further delay $\mu$ to the second component carrier.

Figure 10:
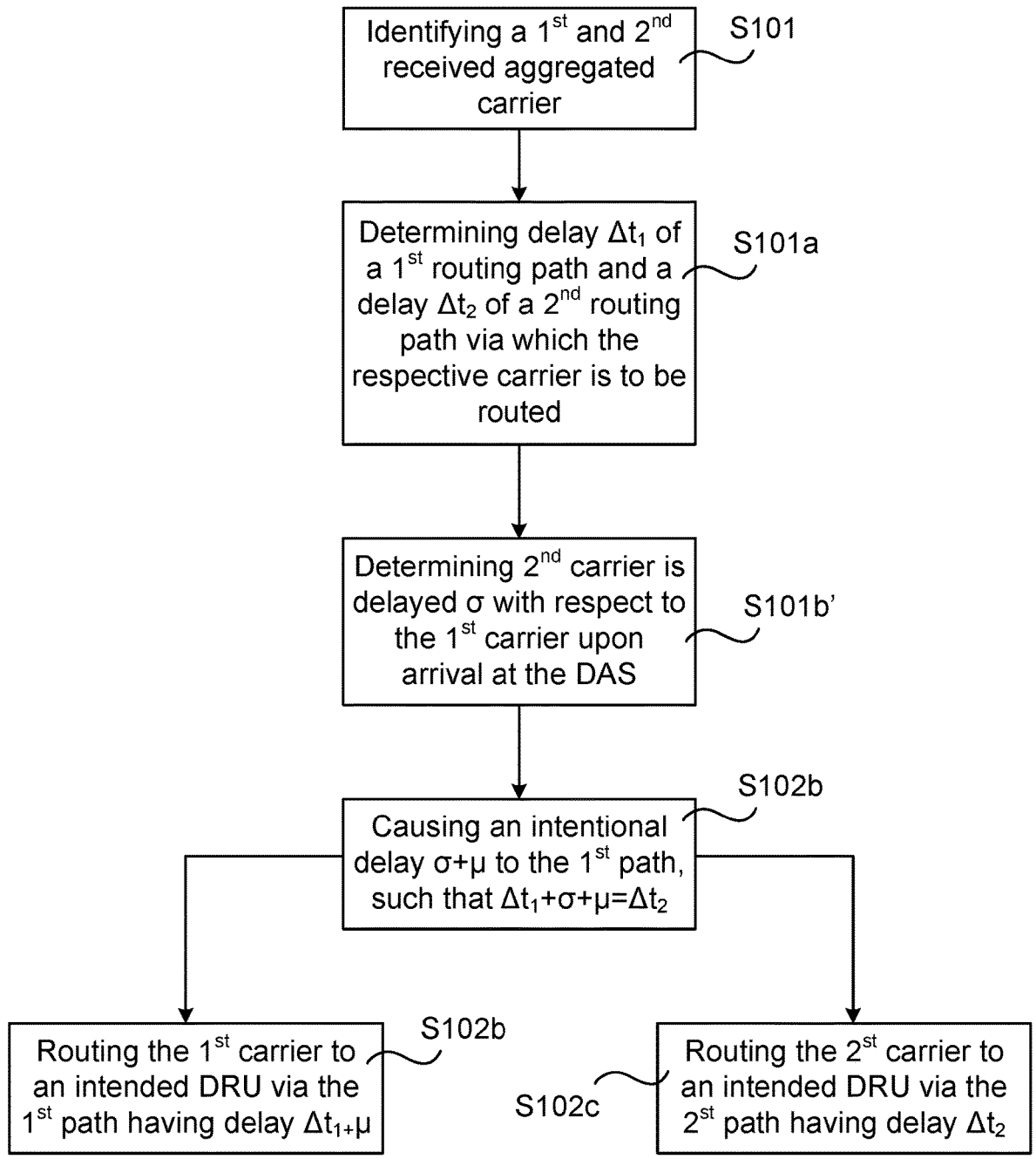
FIG. 10 illustrates a flowchart of a method of routing aggregated carriers through a DAS according to yet another embodiment of the invention.

In yet another embodiment, illustrated with reference to the flowchart of FIG. 10 and to the DAS routing of FIG. 8, it may be the case that one of the first and second component carriers already is delayed in relation to the other upon arrival at the first DMU 301 and the second DMU 302, in particular since these component carriers are transmitted from the operator core network via different BBUs. For instance, the time difference between the two aggregated carriers may amount to Δt.

Hence, after the aggregated carriers are identified by the first DMU 301 in step S101, the first DMU 301 determines in step S101b' that the second component carrier is delayed with σ with respect to the first component carrier.

In this embodiment, the first component carrier will be intentionally delayed by σ and μ in step S101b—to compensate both before the time difference between the two carries upon arriving at the DAS 300 and for the longer processing delay of the second routing path 313, for instance by delaying component carrier data samples in a FIFO ring buffer.

Thereafter, the aggregated carriers are routed via the first and second routing path, respectively, as illustrated in steps S102b and S102c.

When the two component carriers arrive at the DRU 304 for further transmission to the coverage area served by the DRU 304, after respectively having passed through the first routing path 312 and the second routing path 313, the time difference between the first component carrier and the second component carrier has been eliminated.

Given that the aggregated carriers are transmitted substantially simultaneously, almost the full budget of 30 is will be available to the WCD to compensate for possible path delay differences between the DAS antennas and the WCD.

It should be noted that even if it is not possible due to the structure of the DAS 300 to delay the first component carrier with respect to the second component carrier such that any time difference is completely eliminated, it may still be possible to cause a delay to the first component carrier such that the difference in time between the first and the second component carrier is reduced to an acceptable level before the two component carriers are transmitted by the first DRU 304.

It should further be noted that subjecting one or more aggregated carriers to a delay may be undertaken by carefully selecting a routing path through the DAS 300 via a number of functional entities and nodes within the DAS 300, and not a single one of two possible routing paths as is illustrated for brevity in the previously discussed Figures.

For a provider of a DAS, such as the DAS 300 according to the invention, it is possible to measure and thus specify time of flight for signals travelling over various nodes and links in the DAS 300.

A digital DAS can hence be designed in such a way that routing delays are accurately known. For example, if the DAS digital links are based on Common Public Radio Interface (CPRI) standard, they are stipulated in line with standard requirements to have their delay characterized to 16.276 ns.

Advantageously, in embodiments of the invention, as that illustrated with reference to FIG. 8, the DAS 300 will, artificially add delay to "leading" component carriers such that all component carriers intended for a particular WCD are aligned upon arriving at the one or more DRUs providing coverage for that WCD.

In an embodiment, this processing delay is caused using so called ring buffers used for buffering incoming data streams. The ring buffers could be used in the digital DAS 300 to store samples of each aggregated carrier with a variable write to read offset that allows the delay to be adjusted with a resolution of one sample period (for example, this would give a worst case resolution of <50 ns for a 20 MHz bandwidth carrier since it must be sampled at a rate greater than 20 MHz if represented as a complex baseband signal). Hence, the elements of the ring buffer—i.e. samples of each aggregated carrier—would be shifted out with a maximum speed of one element every 50 ns.

In another embodiment, the processing delay is caused using a so called fractional delay filters such as a Farrow filter or polyphase filter to provide a delay adjustment that can be an arbitrary fraction of a sample period.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a digital Distributed Antenna System ("DAS") of routing aggregated carriers, the method comprising:
    receiving a group of carriers at at least one digital master unit of the DAS from an upstream network communication node;
    communicating with a network device to receive information at the at least one digital master unit identifying that a first carrier and a second carrier from the group of carriers comprise an aggregated carrier pair simultaneously carrying data intended to be transmitted to a wireless communication device located in a coverage area served by at least one digital remote unit of a plurality of digital remote units of the DAS;
    determining to which said at least one digital remote unit the identified aggregated carrier pair should be transported;
    grouping the identified aggregated carrier pair; and
    routing the grouped identified aggregated carrier pair through the DAS such that the first carrier and the second carrier are transported to said at least one digital remote unit for transmission to the wireless communication device.

2. The method of claim 1, wherein the routing of the identified aggregated carrier pair through the DAS comprises:
    routing the aggregated carrier pair via a same routing path through the DAS to said at least one digital remote unit for transmission to the wireless communication device.

3. The method of claim 1, wherein in case the routing of the identified aggregated carrier pair through the DAS comprises routing the first carrier and the second carrier via different routing paths, the method further comprises:
    determining a processing delay of each of the different routing paths; and
    controlling a delay element arranged in at least a first of the routing paths having a smaller processing delay than at least a second of the routing paths, to cause further delay to the first carrier routed via the first routing path in order to reduce a time difference between the first carrier routed via the first routing path and the second carrier routed via the second routing path.

4. The method of claim 3, wherein the further delay caused by the delay element in the first routing path is controlled such that a total processing delay of the first routing path equals the processing delay of the second routing path.

5. The method of claim 4, wherein the processing delay of a routing path is determined by:
    acquiring pre-stored delay values from a database accessible by the DAS.

6. The method of claim 3, wherein the step of routing the identified aggregated carrier pair through the DAS via different routing paths further comprises:
  detecting a time difference between the first carrier and the second carrier; wherein the controlling further comprises:
  controlling the delay element arranged in the first of the routing paths, to cause even further delay to the first carrier routed via the first routing path to reduce said time difference between the first carrier routed via the first routing path and the second carrier routed via the second routing path.

7. The method of claim 3, wherein the further delay is caused by buffering samples of the first carrier in a ring buffer.

8. The method of claim 3, wherein the further delay is caused by passing samples of the first carrier through a fractional delay filter.

9. A computer program comprising computer-executable instructions stored on a non-transitory computer readable storage medium, the computer-executable instructions being configured to cause a DAS to perform steps recited in claim 1 when the computer-executable instructions are executed on a processing unit included in the DAS.

10. A digital Distributed Antenna System ("DAS") configured to route aggregated carriers received, the DAS comprising at least one processing unit configured to cause the DAS to:
  receive a group of carriers at at least one digital master unit of the DAS from an upstream network communication node;
  communicate with a network device to receive information at the at least one digital master unit identifying that a first carrier and a second carrier from the group of carriers comprise an aggregated carrier pair simultaneously carrying data intended to be transmitted to a wireless communication device located in a coverage area served by at least one digital remote unit of a plurality of digital remote units of the DAS;
  determine to which said at least one digital remote unit the identified aggregated carrier pair should be transported;
  group the identified aggregated carrier pair; and
  route the grouped identified aggregated carrier pair through the DAS such that the first carrier and the second carrier are transported to said at least one digital remote unit for transmission to the wireless communication device.

11. The DAS method of claim 10, the processing unit being configured to cause the DAS to, when routing the identified aggregated carrier pair through the DAS:
  route the first carrier and the second carrier via a same routing path through the DAS to said at least one digital remote unit for transmission to the wireless communication device.

12. The DAS of claim 10, the processing unit being configured to cause the DAS to, in case the routing of the identified aggregated carrier pair through the DAS comprises routing the first carrier and the second carrier via different routing paths:
  determine a processing delay of each of the different routing paths; and
  control a delay element arranged in at least a first of the routing paths having a smaller processing delay than at least a second of the routing paths, to cause further delay to the first carrier routed via the first routing path in order to reduce a time difference between the first carrier routed via the first routing path and the second carrier routed via the second routing path.

13. The DAS of claim 12, wherein the further delay caused by the delay element in the first routing path is controlled such that a total processing delay of the first routing path equals the processing delay of the second routing path.

14. The DAS of claim 12, the processing unit being configured to cause the DAS to, when determining the processing delay of a routing path:
  acquire pre-stored delay values from a database accessible by the DAS.

15. The DAS of claim 12, the processing unit being configured to cause the DAS to, when routing the identified aggregated carrier pair through the DAS via different routing paths:
  detect a time difference between the first carrier and the second carrier; wherein the controlling further comprises:
  control the delay element arranged in the first of the routing paths, to cause even further delay to the first carrier routed via the first routing path to reduce said time difference between the first carrier routed via the first routing path and the second carrier routed via the second routing path.

16. The DAS of claim 12, wherein the further delay is caused by buffering samples of the first carrier in a ring buffer.

17. The DAS of claim 12, wherein the further delay is caused by passing samples of the first carrier through a fractional delay filter.

* * * * *